United States Patent [19]

Kim

[11] Patent Number: 5,778,048
[45] Date of Patent: Jul. 7, 1998

[54] FEED IMBALANCE DETECTOR IN REPEATED LINE

[75] Inventor: Geun-Ho Kim, Gumi, Rep. of Korea

[73] Assignee: SamSung Electronics Co., Ltd., Kyungki-do, Rep. of Korea

[21] Appl. No.: 689,778

[22] Filed: Aug. 14, 1996

[30] Foreign Application Priority Data

Aug. 18, 1995 [KR] Rep. of Korea .................. 1995-25487

[51] Int. Cl.$^6$ ................ H04M 1/24; H04M 3/08; H04M 3/22
[52] U.S. Cl. .................. 379/4; 379/26; 370/243; 370/246; 375/213; 375/228
[58] Field of Search ................ 379/1, 4, 9–10, 379/15, 12, 16, 22, 25, 30, 34, 399, 400, 412, 23, 26, 32, 296, 338, 343, 348, 349; 375/211, 213, 224, 257, 228; 370/216, 242, 243, 246, 247

[56] References Cited

U.S. PATENT DOCUMENTS

| | | | |
|---|---|---|---|
| 3,297,833 | 1/1967 | Hooten | 379/4 |
| 3,578,914 | 5/1971 | Simonelli. | |
| 3,651,284 | 3/1972 | Maione | 379/4 |
| 3,737,585 | 6/1973 | Ghosh. | |
| 3,758,728 | 9/1973 | Le Rock et al. | 379/4 |
| 3,828,281 | 8/1974 | Chambers, Jr. | 379/4 |
| 3,889,197 | 6/1975 | Dugg. | |
| 3,909,563 | 9/1975 | Ghosh et al. | 375/213 |
| 3,962,549 | 6/1976 | Zuk. | |
| 4,160,884 | 7/1979 | Bishop. | |
| 4,320,265 | 3/1982 | Biggiogera et al.. | |
| 4,406,919 | 9/1983 | Pospischil | 379/4 |
| 4,540,854 | 9/1985 | Berine. | |
| 4,653,093 | 3/1987 | Zofan. | |
| 4,879,641 | 11/1989 | Rossi et al.. | |
| 5,191,595 | 3/1993 | Parsons | 379/4 |
| 5,438,606 | 8/1995 | Cerulli | 379/26 |
| 5,444,776 | 8/1995 | Sheets et al. | 379/899 |
| 5,555,274 | 9/1996 | Sheets | 375/257 |

*Primary Examiner*—Curtis A. Kuntz
*Assistant Examiner*—Binh K. Tieu
*Attorney, Agent, or Firm*—Robert E. Bushnell, Esq.

[57] ABSTRACT

A feed imbalance detector in a repeated line for detecting a feed imbalance in a PCM repeated line and for displaying an alarm includes: a constant current feeder for transmitting an operating voltage to the repeated line; a virtual ground unit for detecting the voltage difference between a plus output port and a minus output port of the constant current feeder; a comparator for comparing the voltage difference with a ground voltage, a detector for determining feed imbalance based on the output level value of the comparator after a predetermined detection time and for outputting a driving signal if feed imbalance is detected, and a display for displaying an alarm upon receiving the driving signal.

6 Claims, 4 Drawing Sheets

FEED IMBALANCE DETECTOR IN REPEATED LINE

CLAIM OF PRIORITY

This application makes reference to, incorporates the same herein, and claims all benefits accruing under 35 U.S.C. §119 from an application for *Feeding Unbalanced Detector In Repeated Line* earlier filed in the Korean Industrial Property Office on 18 Aug. 1995 and there duly assigned Ser. No. 25487/1995.

BACKGROUND OF THE INVENTION

1. Field of the Invention

The present invention relates to a pulse code modulation (PCM) repeated line, and more particularly, to a feed imbalance detector for detecting a feed imbalance in a PCM repeated line and displaying an alarm.

2. Description of the Related Art

In general, a PCM regenerative repeater using symmetrical pairs performs a regenerative repeat function of 24 audio circuit grade T1 that is 1.544 Mb/s and 30 circuit grade E1 that is 2.048 Mb/s.

Normally, a PCM transmission line includes office regenerative repeaters installed in offices at either end of the repeated line and a plurality of line regenerative repeaters connected along the transmission line with the line regenerative repeaters located on either end of the transmission line being respectively connected to the office regenerative repeater closest thereto.

Each office regenerative repeater includes a constant current feeder for transmitting a constant current to the transmission line. Normally, the voltage between a plus port of the constant current feeder and a minus port of the constant current feeder with respect to ground is zero. However, under some circumstances the voltage is not zero and the resulting condition is called a feed imbalance.

Since this feed imbalance is normally caused by an abnormality in the transmission line or one of the line regenerative repeaters, it is important that such an imbalance be detected and an alarm sounded so that the abnormality can be repaired.

Duff, U.S. Pat. No. 3,889,197 utilizes a comparator to determine if the inverting input of an integrator is no longer at virtual ground.

Rossi et al., U.S. Pat. No. 4,879,641, discloses current sensing utilizing a diode bridge connected voltage supply line at a virtual ground.

Beirne, U.S. Pat. No. 4,540,854, discloses a subscriber line interface circuit in which a comparator, whose inputs are connected across a telephone line, detects the grounding of either of the wires of the telephone line.

None of the above-noted references teaches or suggests a feed imbalance detector having the specifically recited features of the present invention.

SUMMARY OF THE INVENTION

Therefore, it is an object of the present invention to provide a feed imbalance detector for a repeated line which can facilitate operation and maintenance by generating an alarm when the fed current is leaked to ground due to the water leakage of an impregnant body in a line regenerative repeater.

It is another object of the present invention to provide a feed imbalance detector for a repeated line which can facilitate operation and maintenance by generating an alarm when a feed incapability state occurs due to a disconnected line in a line regenerative repeater.

It is still another object of the present invention to provide a feed imbalance detector for a repeated line which can facilitate operation and maintenance by generating an alarm when the abnormality of a feeder itself within an office regenerative repeater is generated.

To accomplish the above object, there is provided a circuit for detecting the generation of a feed imbalance in a repeated line, comprising: a constant current feeder for transmitting an operating voltage to the repeated line; a virtual ground unit for detecting the voltage difference between a plus output port and a minus output port of the constant current feeder; a comparator for comparing the voltage difference with a ground voltage; a detector for determining driving feasibility based on the output level value of the comparator after a predetermined detection time and for outputting a driving signal if the detection is checked; and a display for displaying an alarm upon receiving the driving signal.

DETAILED DESCRIPTION OF THE PREFERRED EMBODIMENT

Figure 1:
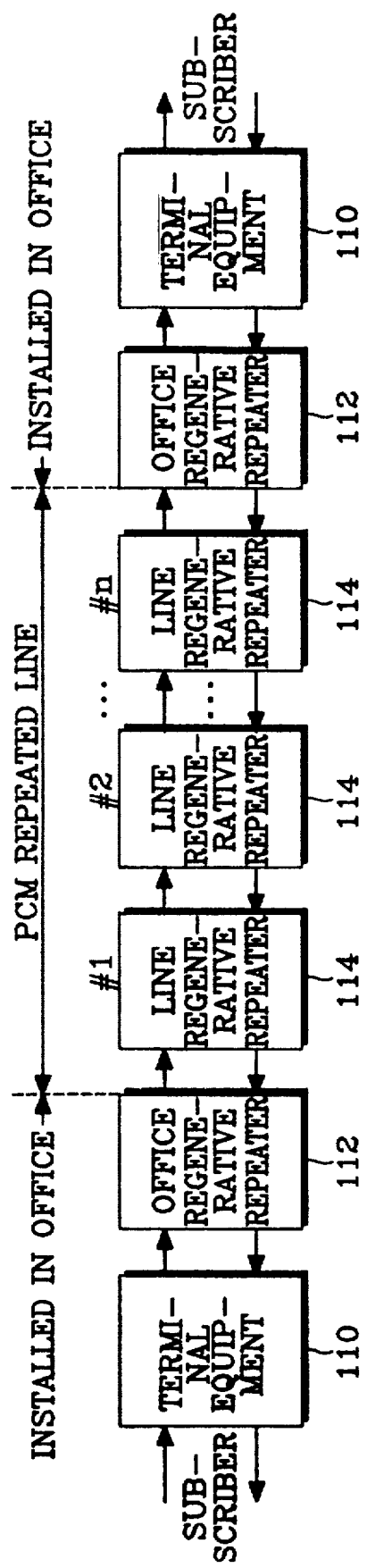
FIG. 1 is a system block diagram of a network for a general PCM regenerative repeater.

FIG. 1 is a system block diagram showing a network of a general PCM regenerative repeater, which will now be described in detail with reference to FIG. 1.

An apparatus constituting a primary group of a transmission system is divided into an office regenerative repeater 112 and a line regenerative repeater 114. The office regenerative repeater 112 is installed in an office and includes a regenerative repeat function and a feeding function for feeding an operating voltage to the line regenerative repeater. The line regenerative repeater 114 installed in an unmanned transit manhole or pillar reproduces pulse streams such as received pulse streams of a T1 or E1 signal transmitted from a piece of terminal equipment 110 through the office regenerative repeater 112 in an exact time period and transmits the same to a next transmission line. The line regenerative repeater 114 connects up to a maximum of 30 lines in an E1 case and up to 24 lines in a T1 case. The line regenerative repeater 114 is positioned within 800 m from the office regenerative repeater 112 and is normally positioned 1.8 Km from another line regenerative repeater 114(#2).

Figure 2:
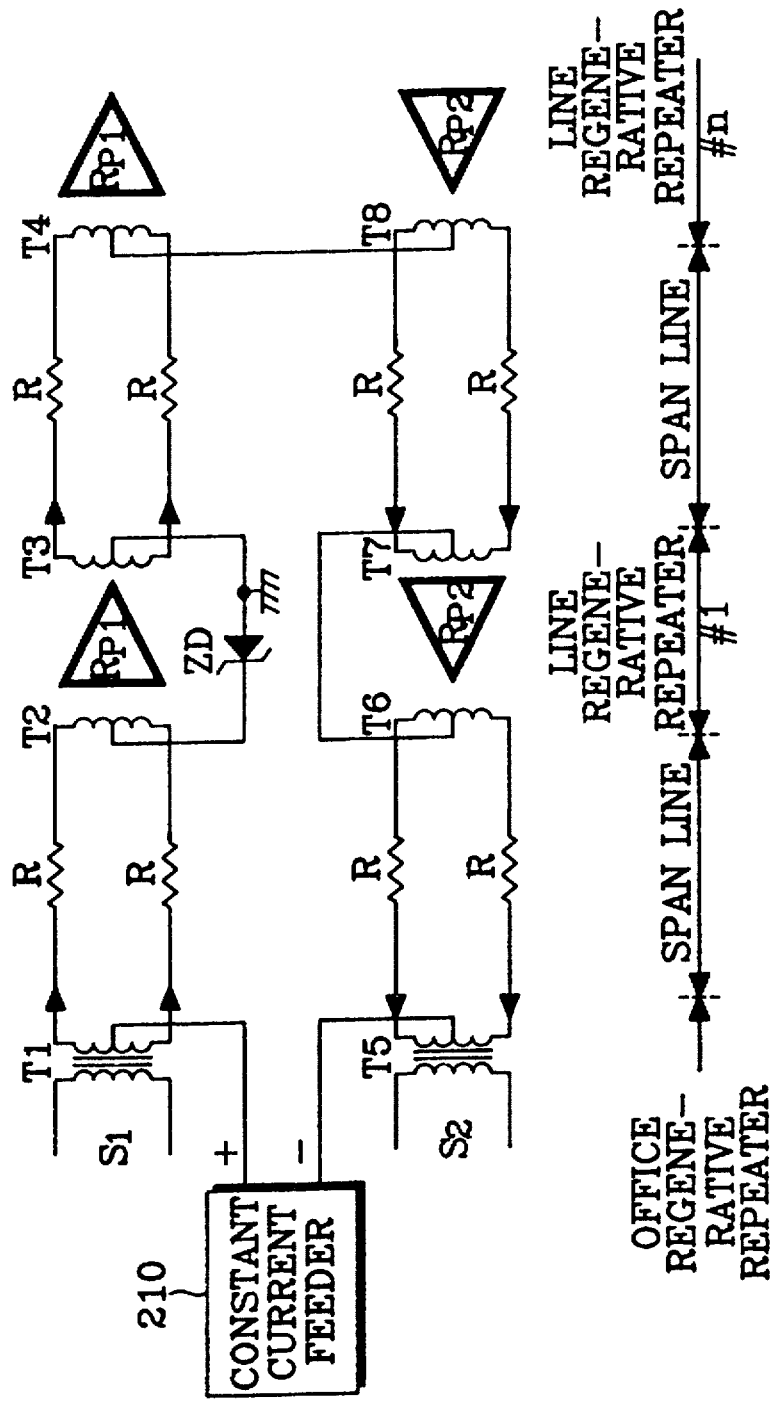
FIG. 2 shows a construction of a general constant-current feeder and repeated line.

FIG. 2 shows a construction of a constant current feeder and a repeated line.

Referring to FIG. 2, a constant current feeder 210 is installed within the office regenerative repeater 112 and transmits the operating voltage to the line regenerative repeater 114. The output current of the constant current feeder 210 is constant, i.e., 48 mA. A direct-current (DC) voltage is transmitted using an intermediate tap of a transformer T. The voltage V+ of a plus port is applied to a first transformer T1 and that V− of a minus port is applied to a fifth transformer T5. Then, a transmission signal S1 is applied to the first transformer T1 and then is transmitted via a transmission line regenerative repeater Rp1. A reception signal S2 is applied to the fifth transformer T5 via a reception line regenerative repeater Rp2. The line regenerative repeaters Rp1 and Rp2 are directed toward a regenerating direction. A transmission/reception line resistance R is disposed in each line interval. The transmission/reception line resistance R in a 0.65 mm cable is 105 Ω/Km. The DC voltage output from the constant current feeder 210 ranges from +100 to −100 volts and changes from 10 to 200 V (DC voltage range) depending the line resistance R and the number of line regenerative repeaters Rp. Assuming that the line interval is 2 Km, the distributed voltage per a line interval is R×48 mA (=about 5.04 V). Then, since the voltage of the line regenerative repeater Rp is 6.8 V, 11.84 V is consumed in driving one line regenerative repeater. The plus port voltage V+ of the DC voltage passes through the line resistance R, a Zener voltage of 6.8 V is subtracted from a Zener diode ZD of the transmission line regenerative repeater Rp1, and the voltage exceeding 6.8 V is saturated to then be transmitted to a line of a next stage. Also, the transmission line regenerative repeater Rp1 is reduced by 6.8 V by the Zener diode ZD. However, since the reception line regenerative repeater Rp2 has no Zener diode ZD, the plus port is higher than the minus port by the Zener voltage level due to the line resistance R1 and Zener diode ZD.

For example, suppose the 10th line regenerative repeater is saturated, $$\left[\left(\frac{R \cdot R}{R+R}\right) \times I + 6.8v\right] \times 10 = 93.2v \quad (1)$$

$$\left[\left(\frac{R \cdot R}{R+R}\right) \times I\right] \times 10 = -25.2 \quad (2)$$

There is generated a voltage ratio difference between the plus and minus voltages according to saturated areas, as expressed in the above relationship (1) and (2). In other words, since there is a Zener diode only at the transmission line regenerative repeater Rp1 side, if a specific area is saturated, a voltage ratio difference of more than 0.8 V~1.25 V is generated. The voltage ratio difference is called a feed imbalance state. The feed imbalance state is generated when the voltage ratio is unbalanced in case of a current leakage due to a saturated line or abnormal feeder characteristics.

Also, the PCM repeated line is in an impregnant body installed in a manhole or pillar. Thus, the PCM repeated line is liable to be disturbed by ambient surroundings. Particularly, a lightning strike or flood during a rainy period adversely affects the operation of the apparatus. The line regenerative repeater Rp may be installed in a pillar, i.e., an electric pole, or a manhole. Now, the manhole type of the present invention will be described. In mountainous countries, the manhole type, specifically, an overhead type line regenerative repeater, is mainly installed. The overhead type line regenerative repeater may be directly buried underground or may be installed via a pipe. By the above-described two types, the line regenerative repeater Rp is kept in the closed impregnant body to prevent the current of the transmission line from being leaked to ground due to water leakage during a rainy period. Also, rainwater is blocked by injecting air from the office through a cable. However, a perfect waterproofing is not possible. Thus, it is important to check for poor waterproofing.

The conventional method of checking for a feeder abnormality is performed by automatically injecting air into the cable and line impregnated body by installing the an air injection device within the office. The pressure of the air injection device is checked during the air leakage before a completely flooded state, which allows the determination of a flood probability. Also, the flooded section is checked and maintained by measuring the air pressure for each section by the use of a air blocking valve for each impregnant body section installed within the impregnant body. Thus, considerable time is consumed. The water leakage is detected by the air injection device. The feeding incapability due to a disconnected line is checked by the feeder of the office regenerative repeater 112. However, the feeder abnormality of the line regenerative repeater itself cannot be detected.

Also, since the line regenerative repeater Rp is operated by the voltage fed from the office regenerative repeater 112, the office regenerative repeater 112 is the most important factor in a line regenerative repeater system. However, by the conventional method, only the loop of the fed current due to the disconnected line is detected. Thus, the alarming state of the feed imbalance cannot be detected exactly.

Hereinbelow, a preferred embodiment of the present invention will be described in detail with reference to accompanying drawings. It should be noted that the same components are designated by the same reference numerals throughout the specification.

Figure 3:
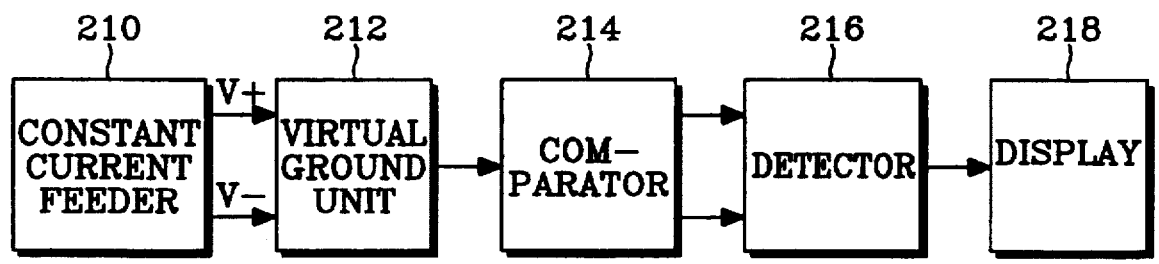
FIG. 3 is a functional block diagram of a feed imbalance detector in a repeated line according to the present invention.
Figure 4:
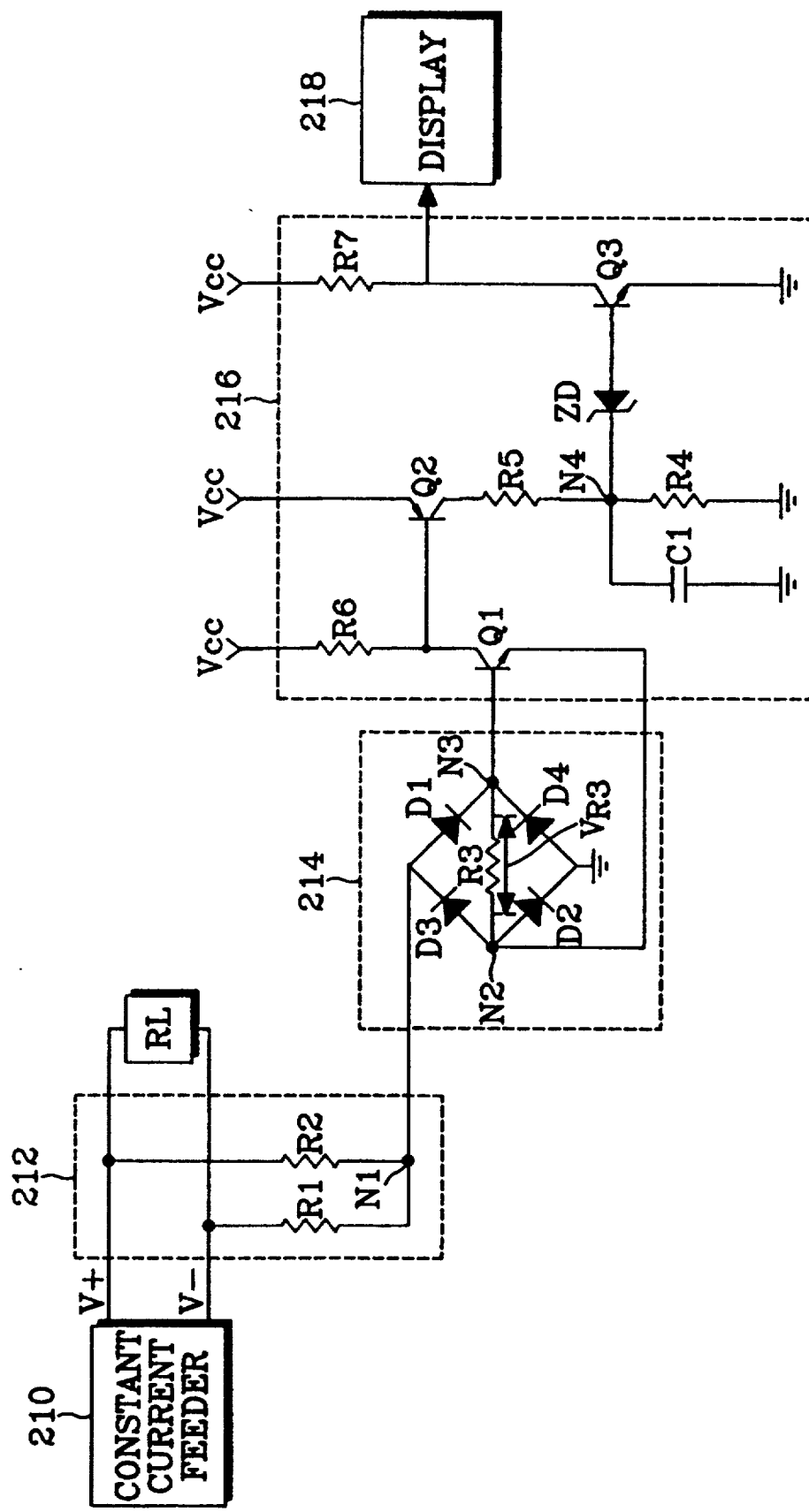
FIG. 4 shows the feed imbalance detector in a repeated line according to the present invention.

The feed imbalance detector in the repeated line shown in FIG. 3 is also shown in FIG. 4.

Referring to FIG. 4, a constant current feeder 210 for transmitting an operating voltage to a line regenerative repeater supplies a direct-current (DC) voltage to a load resistance. Also, a plus output port of the constant current feeder 210 is connected to a second resistance R2. The second resistance R2 is also connected to a first node N1. A minus output port of the constant current feeder 210 is connected to a first resistance R1 which is also connected to the first node N1. The values of the first and second resistances R1 and R2 are the same. Thus, the voltage level of the first node N1 is the difference between the voltage V+ of the plus output port and the voltage V− of the minus output port. A comparator 214 for receiving the voltage of the first node N1 is constituted by bridge diodes. In other words, the comparator 214 is constituted by: a first diode D1 having its anode connected to the first node N1 and having its cathode connected to a third node N3, a second diode D2 having its anode connected to a second node N2 and having its cathode connected to a ground port, a third diode D3 having its cathode connected to the first node N1 and having its anode connected to the second node N2, and a fourth diode D4 having its cathode connected to the third node N3 and having its anode connected to the ground port. A third resistance R3 is connected between the second node N2 and the third node N3. When a positive voltage is applied to the first node N1, the current flows to ground via the first diode D1, third resistance R3 and second diode D2. When a negative voltage is applied to the first node N1, the current flows to ground via the third diode D3, third resistance R3 and fourth diode D4. The voltage $V_{R3}$ across to the third resistance R3 is supplied to a detector 216. In other words, the voltage $V_{R3}$ is supplied to a transistor Q1 of the detector 216 at a turn-on/off level. This is because the third node N3 is connected to a base of the transistor Q1 and the second node N2 is connected to an emitter of the transistor Q1. A collector of the transistor Q1 is connected to a base of a transistor Q2. A fifth resistance R5 is connected between the collector of the transistor Q2 and a fourth node N4. A fourth resistance R4 is connected between the fourth node N4 and the ground port. A capacitor C1 is connected in parallel with the fourth resistance R4 and is connected between the fourth node N4 and the ground port. A constant delay time is generated based on a time constant of the fourth resistance R4 and the capacitor C1 and a Zener voltage of the Zener diode ZD. The delay time is a detection time. When a voltage exceeding the Zener voltage is supplied to the cathode of the Zener diode ZD connected to the fourth node N4, the Zener diode ZD is turned on. An anode of the Zener diode ZD is connected to a base of a transistor Q3. A collector of the transistor Q3 is connected to a display 218.

In a normal state, the voltage ratio generated in the constant current feeder 210 is constant irrespective of a load resistance $R_L$. Since the voltage levels of the plus output port and minus output port are the same, the voltage difference is at a ground level. Thus, the voltage of the first node N1 is at ground level due to the voltage difference. The voltage $V_{R3}$ is at a ground level. Since the voltage level difference between the base and emitter of the transistor Q1 is at a ground level, the transistor Q1 is turned off. Thus, the transistor Q2 is turned off. Then, the fourth node N4 is grounded to then turn the transistor Q3 off. Therefore, a power supply voltage Vcc is supplied to the display 218 so that the display 218 does not perform a display operation.

When a current leakage occurs at a specific area in the line regenerative repeater of load resistance ($R_L$) symmetric pairs due to water leakage, or the plus voltage V+ is greater than the minus voltage V− or vice versa, the circuit according to the present invention does not operate.

For example, assume that the forward voltages of first, second, third and fourth diodes D1, D2, D3 and D4 are set to 0.7 V, a first resistance R1 and a second resistance R2 are set to 100 K, a third resistance R3 is set to 27 K, a turn-on voltage of the transistor Q1 is set to 0.5 V, and a Zener voltage of the Zener diode ZD is set to 2.7 V.

At this time, when the plus voltage V+ is greater than the minus voltage V−, the voltage $V_{R3}$ is obtained by the following equation.

$$V_{R3} = \left[ \frac{V_{N1} - (V_{D1} + V_{D2})}{R_1 + R_3} \right] \times R_3 \quad (3)$$

Also, when the minus voltage V− is greater than the plus voltage V+, the voltage $V_{R3}$ is obtained by the following equation.

$$V_{R3} = \left[ \frac{V_{N1} - (V_{D3} + V_{D4})}{R_1 + R_3} \right] \times R_3 \quad (4)$$

At this time, the equations (3) and (4) have the same meaning because of the same resistance value and diode forward voltage. Thus, when the difference between the plus voltage V+ and minus voltage V− is 20 V, the voltage $V_{R3}$ is obtained based on the above equation (4):

$$V_{R3} = \left[ \frac{20 - (0.7 + 0.7)}{100K + 2.7K} \right] \times 2.7K = 0.488V \quad (5)$$

Since the voltage $V_{R3}$ is less than the turn-on voltage of the transistor Q1, i.e., 0.5 V, the transistor Q1 is turned off.

Also, when the difference between the plus voltage V+ and minus voltage V− is 21 V, the voltage $V_{R3}$ is obtained based on the above equation (3) or (4):

$$V_{R3} = \left[ \frac{21 - (0.7 + 0.7)}{100K + 2.7K} \right] \times 2.7K = 0.515V \quad (6)$$

Since the voltage $V_{R3}$ is greater than the turn-on voltage of the transistor Q i.e., 0.5 V, the transistor Q1 is turned on. Therefore, the power voltage Vcc of the emitter of the transistor Q2 is fed to the fourth resistance R4 and fifth resistance R5 to then be applied to the fourth node N4. At this time, a constant delay time is generated based on a time constant of the capacitor C1 and fourth resistance R4. Also, a detection time is generated until the voltage $V_{N4}$ becomes equal to the Zener voltage 2.7 V. Then, after a predetermined time, when the voltage $V_{N4}$ becomes greater than the Zener voltage 2.7 V, a turn-on voltage is supplied to the base of the transistor Q3 to turn the transistor Q3 on. Then, the collector of the transistor Q3 is grounded. Thus, a driving signal of a ground level is supplied to the display 218. Thereafter, the display 218 displays a visible alarm and audible alarm to allow an operator to be notified.

Figure 5:
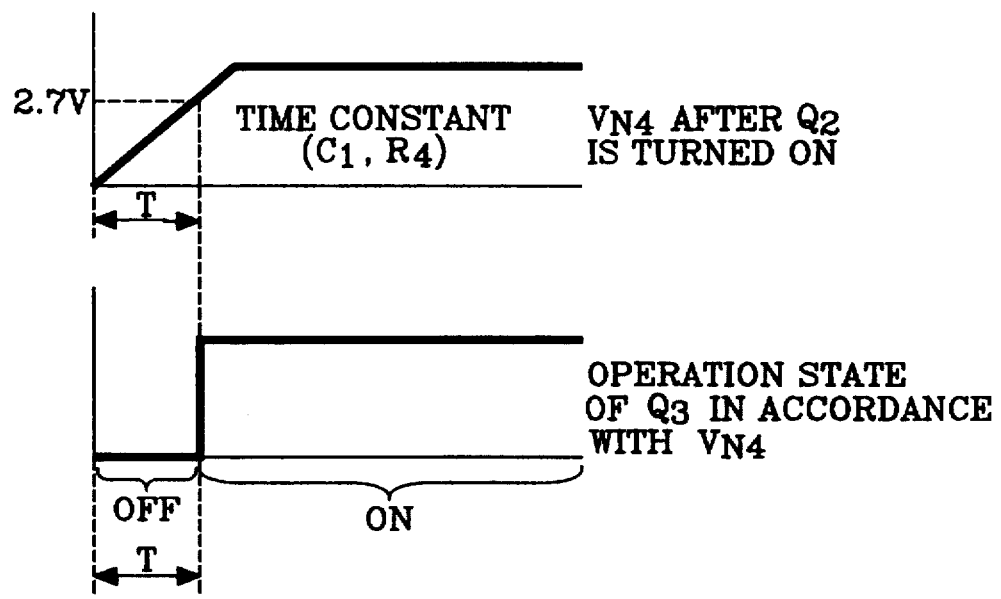
FIG. 5 is a timing diagram for showing the setting of detection time of the feed imbalance detector in a repeated line according to the present invention.

FIG. 5 is a timing diagram for showing the setting of the detection time of the feed imbalance detector in a repeated line according to the present invention. A detailed explanation will be made with reference to FIGS. 4 and 5, which show the level state of the voltage $V_{N4}$ of the fourth node N4 after the transistor Q2 is turned on, based on the time constant of the fourth resistance R4 and capacitor C1. After a detection time T has elapsed after the transistor Q2 has been turned on, the voltage $V_{N4}$ becomes equal to the Zener voltage of 2.7 V. At this time, the Zener diode ZD is saturated. Thus, the Zener diode ZD is turned on. Then, the transistor Q3 is turned after the detection time T has elapsed, to then drive the display 218.

After the detection time T has elapsed, the driving signal at the ground level is applied to the display 218 based on the time constant of the fourth resistance R4 and capacitor C1 and the Zener voltage of 2.7 V, which is for generating an alarm display in full consideration of the time when the abnormal state is generated.

Since the imbalance voltage is set to 20 V in the present invention, the alarm is displayed when the voltage difference is greater than 20 V. This is based on the balance ratio of the output voltage of the constant current feeder 210 in the office regenerative repeater 112, i.e., 0.9~1.1, allowing for a difference of 10 V. In other words, the balance ratio of the plus voltage V+ and minus voltage V− ranges from 0.9 to 1.1 in the constant current feeder 210 itself. As described above, since a voltage consumed for each section of the line regenerative repeater Rp is 11.8 V in case of a line interval of 2 Km, the one section consumption voltage is set higher than a voltage obtained by adding a variable voltage 10 V of the constant current feeder 210 and a voltage 11.8 V of the line regenerative repeater Rp. Therefore, the reference value for detecting the feeding unbalance is 20 V or 10~25 V, which is set by adjusting the third resistance R3.

As described above, when the output balance ratio of the constant current feeder 210 is greater than the reference value, the alarm is displayed. Also, when the line is flooded during operation, the alarm is displayed, thereby greatly improving the quality of the transmission line.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A feed imbalance detector for feed imbalance in a repeated line comprising:

a constant current feeder, having plus and minus output ports, for transmitting an operating voltage to the repeated line;

a virtual ground unit for detecting a voltage difference between said plus output port and said minus output port of said constant current feeder;

a comparator for comparing said voltage difference detected by said virtual ground unit with a ground voltage;

a detector for determining feed imbalance based on an output level value of said comparator after a predetermined detection time and for outputting a driving signal if feed imbalance has been detected; and a display for displaying an alarm upon receiving said driving signal output by said detector.

2. The feed imbalance detector as claimed in claim 1, wherein said virtual ground unit comprises a first resistance connected between said plus output port and said comparator and a second resistance connected between said minus output port and said comparator.

3. A feed imbalance detector for detecting feed imbalance in a repeated line comprising:

a constant current feeder, having plus and minus output ports, for transmitting a operating voltage to the repeated line;

a virtual ground unit for detecting a voltage difference between output ports of said constant current feeder and comprising a first resistance disposed between said plus output port and a first node and a second resistance disposed between said minus output port and said first node;

a comparator for comparing said voltage difference detected by said virtual ground unit with a ground voltage and comprising a diode bridge disposed between said first node and a ground port;

a detector having means for measuring a predetermined detection time, for determining feed imbalance based on an output level value of said comparator after said predetermined detection time and for outputting a driving signal if feed imbalance has been detected; and a display for displaying an alarm upon receiving said driving signal output by said detector.

4. The feed imbalance detector as claimed in claim 3, wherein said comparator comprises a first diode of said diode bridge having an anode connected to said first node and connected between said first node and a third node, a second diode of said diode bridge having an anode connected to a second node and connected between said second node and said ground port, a third diode of said diode bridge having a cathode connected to said first node and connected between said first node and said second node, a fourth diode of said diode bridge having a cathode connected to said third node and connected between said third node and said ground port, and a third resistance connected between said second and third nodes.

5. The feed imbalance detector as claimed in claim 4, wherein said detection time measuring means comprises a fourth resistance and a capacitor connected in parallel and wherein said detection time is in accordance with a time constant of said fourth resistance and said capacitor.

6. A feed imbalance detector for detecting feed imbalance in a repeated line comprising:

a constant current feeder, having plus and minus output ports, for transmitting an operating voltage to the repeated line;

a first resistance having one end connected to said minus port and having another end connected to a first node;

a second resistance having one end connected to said plus port and having another end connected to said first node;

a diode bridge comprising four diodes, a first diode having an anode connected to said first node and having a cathode connected to a third node, a second diode having an anode connected to a second node and having a cathode connected to a ground port, a third diode having an anode connected to said second port and having a cathode connected to said first port and a fourth diode having an anode connected to said ground port and having a cathode connected to said third node;

a third resistance connected between said second node and said third node;

a first transistor having a base connected to said third node and having an emitter connected to said second node;

a fourth resistance having one end connected to a power source and having another end connected to a collector of said first transistor;

a second transistor having an emitter connected to said power source and having a base connected to said collector of said first transistor;

a fifth resistance having one end connected to a collector of said second transistor and having another end connected to a fourth node;

a sixth resistance having one end connected to said fourth node and having another end connected to said ground port;

a capacitor connected in parallel with said sixth resistance;

a third transistor having an emitter connected to said ground port;

a Zener diode having a cathode connected to said fourth node and having an anode connected to a base of said third transistor;

a seventh resistance having one end connected to said power source and having another end connected to a collector of said third transistor, output of said detector being said collector of said third transistor;

wherein, if there is a feed imbalance between said plus and minus output ports of said constant current feeder, an output is provided at said collector of said third transistor for causing a display to provide an alarm.

* * * * *